United States Patent
Palmeri et al.

(10) Patent No.: US 7,099,683 B2
(45) Date of Patent: Aug. 29, 2006

(54) METHOD FOR CONTROLLING THE SIGNAL LEVEL FROM TERMINALS TO A NODE IN A NETWORK IN POINT TO MULTI-POINT RADIO-COMMUNICATION SYSTEMS HAVING TIME DIVISION MULTIPLE ACCESS

(75) Inventors: Francesco Palmeri, Rome (IT); Francesco Testa, Pomezia (IT); Carmelo Decanis, Travaco 'Siccomario-Pavia (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 497 days.

(21) Appl. No.: 10/071,244

(22) Filed: Feb. 11, 2002

(65) Prior Publication Data

US 2002/0123364 A1 Sep. 5, 2002

(30) Foreign Application Priority Data

Feb. 12, 2001 (EP) .......................... 01830087

(51) Int. Cl.
*H04B 7/212* (2006.01)
*H04Q 7/20* (2006.01)

(52) U.S. Cl. ............... 455/522; 455/69; 455/126; 455/127; 455/301; 375/200; 370/330

(58) Field of Classification Search .......... 455/522, 455/69, 126, 127, 3.01; 375/200; 370/330
See application file for complete search history.

(56) References Cited

U.S. PATENT DOCUMENTS

| | | | |
|---|---|---|---|
| 4,829,593 A | | 5/1989 | Hara |
| 5,184,349 A | | 2/1993 | Riordan |
| 5,485,486 A | | 1/1996 | Gilhousen et al. |
| 5,991,329 A | * | 11/1999 | Lomp et al. ............. 375/130 |
| 6,112,071 A | * | 8/2000 | McCune, Jr. ............ 455/337 |
| 6,414,946 B1 | * | 7/2002 | Satou et al. ............. 370/328 |
| 6,519,449 B1 | * | 2/2003 | Zhang et al. ............ 455/69 |
| 6,618,427 B1 | * | 9/2003 | Yasaki ................... 375/130 |

FOREIGN PATENT DOCUMENTS

| | | |
|---|---|---|
| GB | 2331666 A | 5/1999 |
| WO | 97/02665 A | 1/1997 |

* cited by examiner

*Primary Examiner*—Nick Corsaro
*Assistant Examiner*—Alan T. Gantt
(74) *Attorney, Agent, or Firm*—Nixon & Vanderhye P.C.

(57) ABSTRACT

A received signal level is controlled in a node used in a point to multi-point (PmP) radio-communication system having microwave time division multiple access (TDMA). Local node control is activated by an AGC in the receiving node, and simultaneously, a radio control loop is activated from the receiving node to each terminal regulating each terminal's transmitted power level. The receiving node AGC reconfigures quickly and is both accurate and stable.

27 Claims, 2 Drawing Sheets

METHOD FOR CONTROLLING THE SIGNAL LEVEL FROM TERMINALS TO A NODE IN A NETWORK IN POINT TO MULTI-POINT RADIO-COMMUNICATION SYSTEMS HAVING TIME DIVISION MULTIPLE ACCESS

This invention refers to the field of controlling the physical level, and particularly of controlling the signal level in radio systems. More precisely, the invention refers to point to multi-point (PmP) microwave TDMA radio-communication systems, consisting of a radio node (RN) of a network and of a set of user's access terminals, and to the control, in these systems, of the signal level in the direction from terminals to node.

It is known that, presently, there is a trend to introduce point to multi-point (PmP) radio-communication systems in the access network, because of their ability in providing a network without the need of installing cables.

PmP systems typically operate at microwave frequencies and should have terminals and nodes in line-of-sight during the installation, in order to operate properly. In these systems, the transmission consists of a radiofrequency link which allows the communication between a radio node (on the network side) and a number of radio terminals disposed in the buildings where the subscribers are. TDMA being the access technique, the node receives a burst sequence, sent by different transmitters/terminals, set at different distances from the node. Namely, the bi-directional radio-communication which is established in these systems is schematically represented in FIG. 1 of the annexed drawings and comprises, as it is well known, up-link signals from terminals to node and down-link signals from node to terminals.

The need of controlling the power level received by each terminal in the demodulator of the radio node, so as to ensure an optimal demodulation for each possible propagation condition (distance of each terminal, status of the propagation channel, etc.) exists in a system utilising the PmP-TDMA architecture of FIG. 1. Particular care should be devoted to the phenomenon of rain attenuation, which, as it is well known, damages the transmission on the radio connection, reducing the power level of the signal even by some tens of dB, depending on the rain zone, on the length of the radio link and on the requested system availability.

On the receiver side, the level of the signal at the input of the digital demodulator should be kept within a suitable dynamic window, immediately before the analogue to digital (A/D) conversion, relatively to the effective number of available bits, so as to avoid the impairment of the decision performance of the receiver in the whole power dynamic which is expected at radio frequency.

Thus, the control of the signal level of each transmission burst is necessary in TDMA systems.

The problem has been up to now faced and solved by employing two different techniques, both of which however exhibit drawbacks.

A remote control of the power on each terminal is employed according to a first technique. The node demodulator finds out the signal level received for each burst and sends the control loop message to control the transmitted power of each terminal.

The control of the intermediate frequency (IF) gain of the receiver is provided by a second technique. The node demodulator finds out the signal level for each burst and acts on the circuit of automatic gain control at intermediate frequency, so as to compensate each change.

The remote control loop alone adversely has a limited control bandwidth, since the control speed is proportional to the number of control messages exchanged, and so to the engagement of the band intended to the traffic.

Conversely, the use of the circuit of automatic gain control (AGC) alone at the receiving side has the disadvantage of forcing the terminals to transmit at the highest power level even when no rain attenuation arises, the power level of the terminals being adjusted upon the installation, depending only on the distance from the node.

The object of this invention is to provide a new technique to solve the above mentioned problems, relating to the control of the signal level.

The invention is in that it provides—in point to multi-point microwave TDMA radio-communication systems—the carrying out of the control of signal level, by activating a local control in the node receiver by a particular AGC and simultaneously a radio control loop, from the node to each terminal, which adjusts the transmitted power level.

Advantageously, the fast AGC employed to carry out the invention is a circuit fast in the re-configuration and simultaneously precise and stable during the working phases. Preferably, it consists of a high-accuracy, fixed-gain amplifier and of a variable attenuator with high accuracy and ready stability relatively to the changes in the attenuation.

The invention is now described more in depth, by referring to the annexed drawings, wherein.

Figure 1:
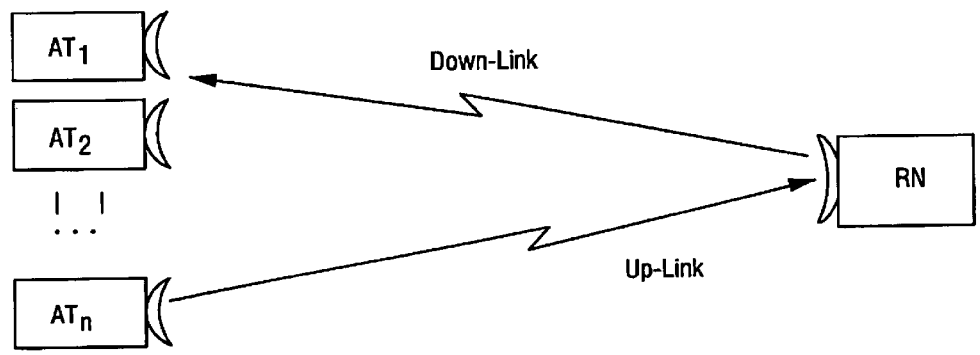
FIG. 1 is a scheme of the already considered PmP-TDMA architecture, wherein the control method according to the invention is utilised.
Figure 2:
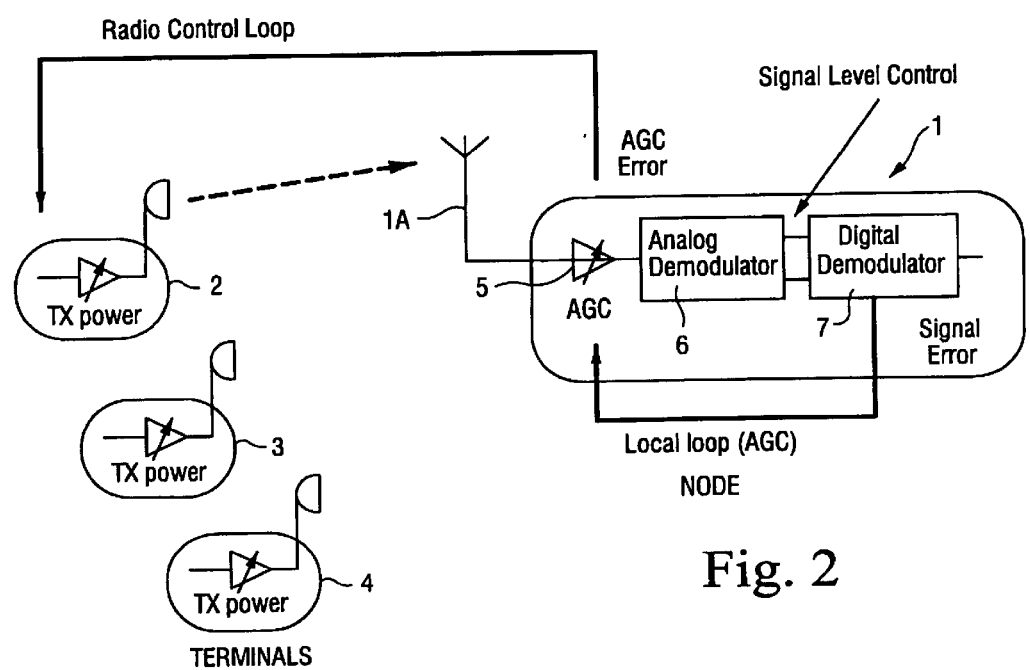
FIG. 2 shows how to operate with the new technique which has been proposed in a radio-communication system like the one in FIG. 1.

A radio node (RN) 1 with its antenna 1A and some access terminals (AT) 2, 3 and 4 are shown in FIG. 2. The Node 1 comprises, as it is well known, an analogue demodulator 6 and a digital demodulator 7. As already stated, the object of the invention is that the signal widths at the input of the digital demodulator 7 of the node 1 be equal for each terminal and in any propagation condition during communications.

Because of TDMA transmission, the signal level of subsequent burst, which is sensed by the node receiver, depends on the link condition of the specific terminal and can involve a wide range of changes. The AGC 5 should be fast enough to be able to switch the gain during the guard time which separates two adjacent bursts.

The guard time should be as short as possible (e.g. 200–400 ns), in order to maximise transmission efficiency.

The information about the gain level (AGC) is updated for each specific terminal upon each transmission frame and reset when the corresponding burst is received.

The invention proposes to use the indication given by the level value of the AGC for each terminal, in order to remotely control its power level, by sending a control message. Indeed, the present AGC level is an indirect measure of the power change which the terminal has to carry out to keep optimal transmission performance.

The local AGC is used as a dynamic buffer in the proposed algorithm, thus allowing to reduce the number of control messages. Indeed, an accurate level control and proper corrections can be ensured during fast transient by the local AGC, without sending control messages, thus keeping the capacity of the band reserved to users. This feature is fundamental in the TDMA transmission to minimise the waste of spectral resource when a great number of terminals are to be controlled. Indeed, a TDMA system shares the spectral resource by a division into time slots and the allocation of groups of time slots to each user, depending on the present band needs of the user himself.

In the case of a PmP-TDMA architecture with dynamic allocation of the band, the extent of time use of the shared channel depends on the number of active users served by a certain radio node and on the activity extent of the single user. Accordingly, the number of active time slots in a time period (which is proportional to the mean power in the same period) is not predictable.

As known, the architecture for the node receiver is usually comprised of an outdoor part and of an indoor part. The two parts are connected by one or more interconnection cables.

Figure 4:
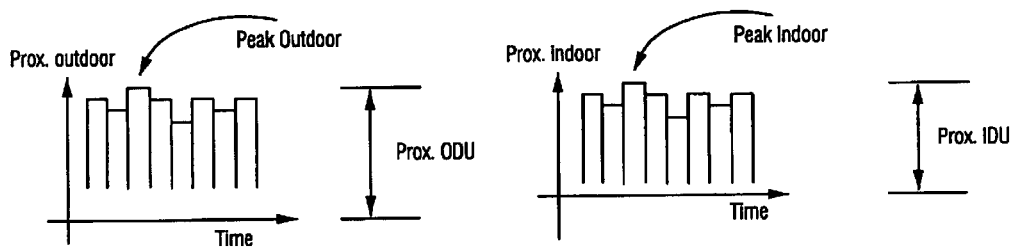
FIG. 4 shows the profile of signal level in a PmP-TDMA system according to the invention.

Typical profiles of the signal levels received in a PmP-TDMA system are reported in FIG. 4, where the left diagram shows the power outdoor profile, i.e. at the input of the antenna 1A, and the right diagram shows the indoor power profile, i.e. at the input of the demodulator 6. The amplitude peak of these profiles can be used to control the gain in the node receiver chain, comparing the peak in the information measured in the outdoor unit with the one measured in the indoor unit, as explained below.

Since the outdoor part should operate in a very wide temperature range, for example (−40° C.+60° C.) and at very high carrier frequencies, it is inherently more expensive than the indoor part. Its complexity should therefore be limited as much as possible, even with damage of the indoor part, so as to keep the costs of the device low and not to impair its wide scale production.

Namely, in order to keep a strong implementation and an acceptable cost level of the outdoor part, it is advisable to avoid the implementation of fast and accurate AGC. Accordingly, the amplification in the outdoor part is usually at a constant nominal gain.

Therefore the variable AGC in the indoor part should be able to ascertain the changes in the propagation conditions (rain attenuation) and the changes in gain/attenuation relative to the front-end amplifier of the receiver and to the cable connecting indoor and outdoor (the latter having changeable length and features).

Figure 5:
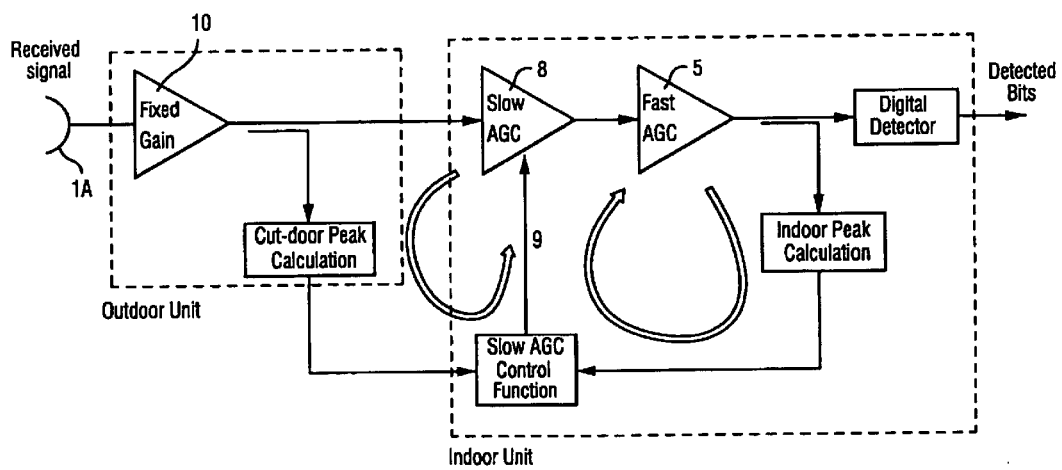
FIG. 5 shows the implementation of the algorithm of the gain control in the reception chain of the node.

This is carried out with the implementation in FIG. 5, which shows the whole AGC of the node receiver being comprised, according to the invention, of three different sub-blocks.

The first sub-block is a fixed amplifier 10, having high accuracy and fixed gain (outdoor part).

Figure 3:
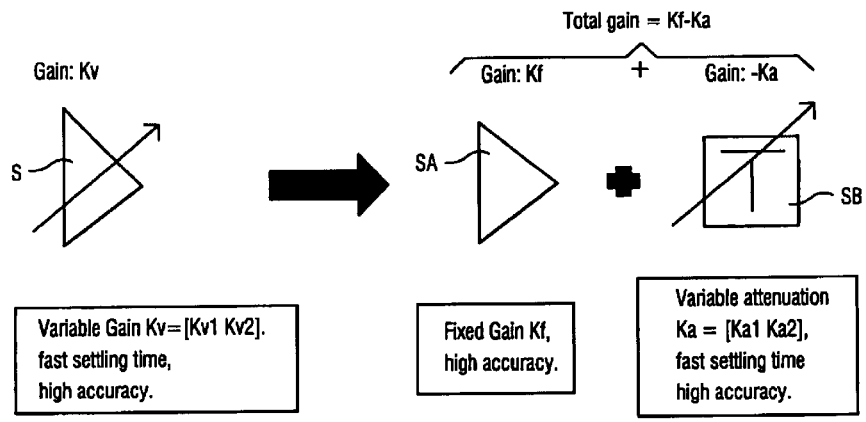
FIG. 3 shows the implementation of an AGC fast in re-configuration and simultaneously accurate and stable during the working phases, in the radio node of the system in FIG. 2.

The second sub-block is a fast AGC 5, comprised of a fixed amplifier 5A and of a variable attenuator 5B (see FIG. 3), having high accuracy and ready stability with respect to the changes in attenuation (indoor part). The amplifier 5A has a fixed gain e.g. in the range of 30–40 dB with a variation of less than e.g. 6 dB over time. The attenuator 5B has a dynamic range of e.g. 30 dB and a response time of e.g. 200 ns, i.e. it might take 200 ms until the attenuator 5B reaches the attenuation ordered. The attenuator 5B reaches the ordered attenuation with e.g. 1 dB variation over time.

The third sub-block is a slow AGC 8, having a dynamic range smaller than the first one and limited speed, which has the task of balancing the changes in gain of the reception chain of the node (indoor part). The slow AGC 8 has a dynamic range of e.g. 20 dB and a response time of e.g. >50 ms, i.e. might take more than 50 ms until the AGC reaches a ordered value.

Such a slow AGC does not have to re-configure during the guard time, it simply has to allow for the changes in common mode gain. The use of this sub-block allows reduction of the dynamics requirements with respect to the fast AGC sub-block (which should discriminate the single terminal).

The problem of controlling the gain inside the radio node operating according to the PmP-TDMA mode through the use of information about the peak of received power is solved by the inventive method.

Information about the peak in the signal with respect both to the indoor part and to the outdoor part is used in the control algorithm.

Indeed, the difference between the two peak values calculated for each part depends only on the gain changes inside the receiver and not on the changes in channel conditions.

In the proposed method, a suitable control circuit 9, shown in FIG. 5, provides to keep the difference between the two peak values of the received signal constant in different points of the system.

Therefore, three different control loops are simultaneously present and active in the up-link channel:

A. Power control of the transmitting terminal (outdoor);

B. Control of fast AGC in the receiver of the radio node (indoor) on access terminal basis;

C. Control of the slow AGC, which is common for all of the terminals in the receiver of the radio node (indoor) to allow for gain/attenuation changes inside the receiving chain, in the case of PmP-TDMA reception.

The band of each control loop is accurately chosen, so that all of the loops present in the up-link channel remain stable, although they operate in concurrent way.

The stability of the whole system is obtained by using sufficiently distinct bands for each of the three loops.

Actually, if it is desired to ensure a good signal/noise (S/N) ratio at the receiver input by using the minimum transmission power, a nominal value should be set for the AGC level, which defines its reference level, The difference between the present AGC value of the specific terminal and the global reference level determines the correction message to send to the terminal itself.

If, for example, a nominal AGC value is set to 10 dB and a present level of 15 dB arises, it means that the transmission power is by 5 dB lower than the required transmission level and a control message should be sent in order to compensate this deficiency.

When rain attenuation arises, the fast AGC rapidly increases the gain, so as to maintain the power level in the dynamic field of the demodulator, but this causes a displacement of the fast AGC level from the reference value and a control message is sent, so as to increase the transmission power of the terminal.

The whole available transmission power of the terminal will be used against the attenuation during a long and strong attenuation. Indeed, until the fast AGC reaches the reference level, the transmitter receives messages to increase its power.

The new inventive technique has the advantage of controlling the power level in any attenuation situation, so as to meet the requirements of S/N ratio at the input of the digital demodulator 7 of the node, without going over the transmission power of the terminal transmitters and keeping the level of the input power within the dynamic field of the demodulator.

Furthermore, the control bandwidth is kept small in the proposed implementation, in order to use this control in the TDMA transmission when—as it is usual—many terminals have to be simultaneously controlled.

This technique allows to reach a performance in operating more than sixty terminals with a radio channel which is subjected to a 100 dB/s attenuation, without a substantial waste of the bandwidth from node to terminals. Furthermore, the requirements of total level control dynamics of the system can be split between transmitter and receiver.

What is claimed is:

1. A method for controlling a received signal level in a microwave, time division multiple access (TDMA), point-to-multi-point (PmP), radio communications system, wherein a node receiver includes an outdoor unit coupled to an antenna and to an indoor unit, the indoor unit including a demodulator, the node receiver also including a fast AGC and a slow AGC, and wherein the slow AGC is updated using peak amplitude information from both an outdoor unit measurement point associated with an input from the antenna and an indoor unit measurement point associated with an input to the demodulator.

2. The control method as claimed in claim 1, wherein the AGC employed in the node receiver is quickly re-configurable, accurate, and stable.

3. Control method as claimed in claim 1, wherein the fast AGC has high accuracy and a fixed gain, and the slow AGC has high accuracy and stability with respect to changes in attenuation.

4. The control method as claimed in claim 1, wherein the receiver node activates a radio control loop for each of multiple remote access terminals to control a transmit power level of each remote access terminal.

5. A control method for a signal level in a point-to-point-multipoint microwave time division multiple access (TDMA) radio-communication system of the type where a radio control loop is activated from a common radio node to regulate the transmitted signal power level of a plurality of remote access terminals, said node including a local control loop comprising an AGC, wherein said local control loop in said node is activated through a fast AGC used as a dynamic buffer to adjust the signal power level of each individual terminal input in a demodulator of the node during a fast transient of the signal level and is able to discriminate a single terminal signal, and wherein the local control loop allows a reduced number of control messages to be transmitted in the radio control loop to each of the remote access terminals.

6. The control method in claim 5, further comprising:
setting a reference value for said fast AGC in the node,
issuing a control message in the radio control loop when there is a difference between a current fast AGC level and the reference value.

7. The control method as in claim 5, wherein said node includes a slow AGC common to all of the remote access terminals that balances changes in gain of the reception chain of the node for all of the remote access terminals.

8. The control method as in claim 7, wherein the operative bandwidths of the slow AGC control loop, the fast AGC control loop, and the radio control loop are sufficiently distinct in order to ensure stability of the system.

9. The control method as in claim 7, wherein said radio node comprises an outdoor unit and an indoor unit, wherein the slow AGC is implemented in the indoor unit of the radio node and is updated using the peak amplitude information of the signal received by the node.

10. The control method in claim 7, wherein the slow AGC has a dynamic range smaller than the fast AGC and a response time >50 ms.

11. The control method as in claim 9, wherein said peak amplitude information is obtained by comparing peak information of the signal measured in said outdoor unit with respect to the one measured in the indoor unit.

12. A radio node for use in a radio communication system, comprising:
a radio control loop for regulating a power level of a signal transmitted by each of plural remote access terminals to the radio node;
a demodulator;
a fast AGC for individually adjusting a signal power level of a signal received from each one of the remote access terminals before input to the demodulator, wherein the individual signal power level adjustment for one of the remote access terminals is different than the individual signal power level adjustment for another of the remote access terminals; and
wherein the fast AGC allows a reduced number of control messages to be transmitted in the radio control loop to each of the remote access terminals.

13. The radio node in claim 12, wherein the radio control loop is configured to issue a control message in the radio control loop when there is a difference between a current fast AGC level and a reference value.

14. The radio node as in claim 12, wherein a slow AGC, coupled to the fast AGC, for balancing gain changes in a receiving chain of the radio node for all of the remote access terminals.

15. The radio node in claim 14, wherein the slow AGC has a dynamic range smaller than the fast AGC and a response time greater than 50 ms.

16. The radio node as in claim 14, wherein bandwidths of the slow AGC, the fast AGC, and the radio control loop are sufficiently distinct in order to ensure stability.

17. A radio node for use in a radio communication system, comprising:
a radio control loop for regulating a power level of a signal transmitted by each of plural remote access terminals to the radio node;
a demodulator;
a fast AGC for adjusting a signal power level of a signal received from each one of the remote access terminals before input to the demodulator;
a slow AGC, coupled to the fast AGC, for balancing gain changes in a receiving chain of the radio node for all of the remote access terminals; and
an outdoor unit and an indoor unit,
wherein the slow AGC is implemented in the indoor unit and is configured to be updated using peak amplitude information of the signal received by the radio node.

18. The radio node as in claim 17, further comprising:
means for obtaining the peak amplitude information by comparing peak amplitude information measured in the outdoor unit with peak amplitude information measured in the indoor unit.

19. The radio node in claim 18, further comprising:
a fixed gain amplifier in the outdoor unit, and
means for obtaining the outdoor peak amplitude information from an output of the fixed gain amplifier.

20. A radio node for use in a radio communication system, comprising:
radio control loop means for regulating a signal power level transmitted from each of plural remote access radio terminals to the radio node, and a receiver chain including:
  demodulator means for demodulating signals received from each remote access terminal;
  fast AGC means for individually adjusting a signal power level of a signal received from each remote access terminal before input to the demodulator means, wherein the individual signal power level adjustment for one of the remote access terminals is different than the individual signal power level adjustment for another of the remote access terminal.

21. The radio node in claim 20, wherein the radio control loop means includes means for issuing a control message in the radio control loop when there is a difference between a current fast AGC level and a reference value.

22. The radio node in claim 20, further comprising:
  slow AGC means for balancing gain changes in the receiver chain based on the signals received from all the remote access terminals.

23. The radio node in claim 22, wherein the slow AGC means has a dynamic range smaller than the fast AGC means and a response time greater than 50 ms.

24. The radio node as in claim 22, wherein bandwidths of the slow AGC, the fast AGC, and the radio control loop are sufficiently distinct in order to ensure stability.

25. The radio node as in claim 22, further comprising;
  an outdoor unit and an indoor unit,
  wherein the slow AGC is implemented in the indoor unit and is configured to be updated using peak amplitude information of the signal received by the radio node.

26. The radio node as in claim 25, further comprising:
  means for obtaining the peak amplitude information by comparing peak amplitude information measured in the outdoor unit with peak amplitude information measured in the indoor unit.

27. The radio node in claim 26, further comprising:
  a fixed gain amplifier in the outdoor unit, and
  means for obtaining the outdoor peak amplitude information from an output of the fixed gain amplifier.

* * * * *